(12) United States Patent
Zhu

(10) Patent No.: US 12,443,647 B2
(45) Date of Patent: Oct. 14, 2025

(54) INFORMATION DISPLAY METHOD AND APPARATUS, AND COMPUTER STORAGE MEDIUM

(71) Applicant: BEIJING BYTEDANCE NETWORK TECHNOLOGY CO., LTD., Beijing (CN)

(72) Inventor: Shuohong Zhu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/233,279

(22) Filed: Aug. 11, 2023

(65) Prior Publication Data

US 2023/0385330 A1  Nov. 30, 2023

Related U.S. Application Data

(63) Continuation of application No. PCT/CN2022/085790, filed on Apr. 8, 2022.

(30) Foreign Application Priority Data

May 12, 2021 (CN) .......................... 202110518938.2

(51) Int. Cl.
  *G06F 16/438*  (2019.01)
  *G06F 16/432*  (2019.01)
  *G06F 16/44*  (2019.01)

(52) U.S. Cl.
  CPC .......... *G06F 16/438* (2019.01); *G06F 16/432* (2019.01); *G06F 16/44* (2019.01)

(58) Field of Classification Search
  CPC ....... G06F 16/438; G06F 16/432; G06F 16/44
  (Continued)

(56) References Cited

U.S. PATENT DOCUMENTS 9,733,809 B1 * 8/2017 Greene ................. G06F 3/0482
10,455,281 B2 * 10/2019 Oztaskent .......... H04N 21/4394
(Continued)

FOREIGN PATENT DOCUMENTS

CN   104978368 A   10/2015
CN   105389361 A   3/2016
(Continued)

OTHER PUBLICATIONS

English Translation of CN 111163348 (Year: 2020).*
(Continued)

*Primary Examiner* — Kimberly L Wilson
(74) *Attorney, Agent, or Firm* — BakerHostetler

(57) ABSTRACT

This disclosure describes techniques for displaying information. A search box is displayed in a first preset area of a page, and a first multimedia resource is played in a second preset area of the same page where the search box is displayed. First recommended search information related to the first multimedia resource is synchronously displayed in the search box while playing the first multimedia resource. The first multimedia resource is switched to a second multimedia resource in the second preset area and playing the second multimedia resource in response to a trigger operation. It is synchronously switched to display second recommended search information related to the second multimedia resource in the search box when switching the first multimedia resource to the second multimedia resource.

12 Claims, 11 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 11,543,960 | B2* | 1/2023 | Kaemmerer | G06F 3/0236 |
| 2007/0162422 | A1* | 7/2007 | Djabarov | G06F 16/2453 |
| 2011/0302188 | A1 | 12/2011 | Djabarov | |
| 2014/0188926 | A1* | 7/2014 | Chandel | G06F 16/435 |
| | | | | 707/767 |
| 2015/0256900 | A1* | 9/2015 | Reese | H04N 21/25891 |
| | | | | 725/13 |
| 2015/0334144 | A1* | 11/2015 | Kauffmann | H04N 21/6405 |
| | | | | 709/219 |
| 2018/0232460 | A1* | 8/2018 | Goryachev | G06F 16/9535 |
| 2020/0110839 | A1 | 4/2020 | Wang et al. | |

FOREIGN PATENT DOCUMENTS

| | | | |
|---|---|---|---|
| CN | 109190049 | A | 1/2019 |
| CN | 106055595 | B | 10/2019 |
| CN | 110609946 | A | 12/2019 |
| CN | 111143610 | A | 5/2020 |
| CN | 111163348 | A * | 5/2020 |
| CN | 111259173 | A | 6/2020 |
| CN | 111368185 | A | 7/2020 |
| CN | 111428120 | A | 7/2020 |
| CN | 112199524 | A | 1/2021 |
| CN | 113111286 | A | 7/2021 |
| JP | 2006-155336 | A | 6/2006 |
| JP | 2010-146570 | A | 7/2010 |
| JP | 2011-170735 | A | 9/2011 |
| JP | 2012-256350 | A | 12/2012 |
| WO | WO 2016/091044 | A1 | 6/2016 |
| WO | WO 2017/076038 | A1 | 5/2017 |
| WO | WO 2017/092198 | A1 | 6/2017 |

OTHER PUBLICATIONS

English Translation of CN111143610A (Year: 2020).*
English Translation of KR 20210025422A—Mar. 9, 2021 (Year: 2021).*
International Patent Application No. PCT/CN2022/085790; Int'l Search Report; dated Jul. 8, 2022; 2 pages.
Yan Ziqi; "Take micro blog as an example to analyze the video recommendation algorithm in social networking sites"; DCSE Information Technology Exploration; Dec. 2018; p. 148-149 (contains English Abstract).
European Patent Application No. 22806380.6; Extended Search Report; dated Jun. 11, 2024; 7 pages.
Written Opinion for International Application No. PCT/CN2022/085790, mailed Jul. 8, 2022, 08 Pages.

* cited by examiner

INFORMATION DISPLAY METHOD AND APPARATUS, AND COMPUTER STORAGE MEDIUM

CROSS REFERENCE

This disclosure is a continuation of PCT application No. PCT/CN2022/085790, titled "INFORMATION DISPLAY METHOD AND APPARATUS, AND COMPUTER STORAGE MEDIUM", filed on Apr. 8, 2022, which claims priority to Chinese patent application No. 202110518938.2, filed on May 12, 2021, and entitled "INFORMATION DISPLAY METHOD AND APPARATUS, AND COMPUTER STORAGE MEDIUM", the entire contents of both of which are incorporated herein by reference.

TECHNICAL FIELD

The present disclosure relates to the technical field of Internet, in particular to an information display method and apparatus, and computer storage medium.

BACKGROUND

With the continuous development of Internet technology, searching information through terminal applications or websites has become the main source for people to obtain information.

If a general user has a search demand when watching media resources, the user needs to exit the media resources and switch to a browser or an application with search function to initiate a search. This process is cumbersome, time-consuming and inefficient in information acquisition.

SUMMARY

Embodiments of the present disclosure at least provide an information display method, an information display method and apparatus, and computer storage medium.

In a first aspect, an embodiment of the present disclosure provides an information display method, including:
  displaying a search box in a first preset area of a page, and playing a first multimedia resource in a second preset area; wherein first recommended search information related to the first multimedia resource is displayed in the search box; and
  switching the first multimedia resource to a second multimedia resource in the second preset area and playing the second multimedia resource in response to a trigger operation, wherein second recommended search information related to the second multimedia resource is correspondingly displayed in the search box.

In a second aspect, the present disclosure provides an information display device, including:
  a first processing module, configured to display a search box in a first preset area of a page and play a first multimedia resource in a second preset area; wherein first recommended search information related to the first multimedia resource is displayed in the search box; and a second processing module, configured to switch the first multimedia resource to a
  second multimedia resource in the second preset area and play the second multimedia resource in response to a trigger operation, wherein second recommended search information related to the second multimedia resource is correspondingly displayed in the search box.

In a third aspect, an alternative embodiment of the present disclosure also provides computer equipment, which includes a processor and a memory, wherein the memory stores machine readable instructions executable by the processor, and the processor is configured to execute the machine readable instructions stored in the memory, and when the machine readable instructions are executed by the processor, the steps of the information display method described in the first aspect or any possible embodiment of the first aspect are executed.

In a fourth aspect, an alternative embodiment of the present disclosure also provides a computer-readable storage medium, storing a computer program, and when the computer program is run by a processor, the steps of the information display method described in the first aspect or any possible embodiment of the first aspect are executed.

According to the information display method, the information display device and the computer storage medium provided by the embodiment of the present disclosure, a search box is displayed in a first preset area of a page, a first multimedia resource is played in a second preset area, and at this time, first recommended search information related to the first multimedia resource is displayed in the search box; in response to a trigger operation, the first multimedia resource is switched to a second multimedia resource in the second preset area, the second multimedia resource is played, and at this time, second recommended search information related to the second multimedia resource is displayed in the search box; in the present disclosure, a search box containing recommended search information related to a multimedia resource can be displayed in a first preset area of a playing page of the multimedia resource (such as a detail page of the multimedia resource, which is a video playing page if the multimedia resource is a video). In addition, when the multimedia resource played in a second preset area is switched, the recommended search information in the search box can be changed with the currently played multimedia resource, thereby providing a channel for initiating a quick search for the currently played multimedia resource, being simple in operation and improving the efficiency of information search.

For the description of the effects of the information display device, the computer equipment and the computer-readable storage medium, please refer to the description of the information display method, which will not be repeated here.

In order to make the above objectives, features and advantages of the present disclosure more obvious and understandable, a detailed description of preferred embodiments will be made below with reference to the accompanying drawings.

BRIEF DESCRIPTION OF THE DRAWINGS

In order to more clearly illustrate the technical solution of the embodiment of the present disclosure, the following will be briefly introduced to the drawings required in the embodiment, the drawings herein are incorporated into the specification and form part of the present specification, these drawings illustrate embodiments conforming to the present disclosure, and together with the description are used to illustrate the technical solution of the present disclosure. It should be understood that the following drawings only illustrate certain embodiments of the present disclosure, so should not be regarded as a limitation of scope, for those of ordinary skill in the art, without the need for creative effort, other relevant drawings may be obtained according to these drawings.

DETAILED DESCRIPTION OF PREFERRED EMBODIMENTS

Figure 1:
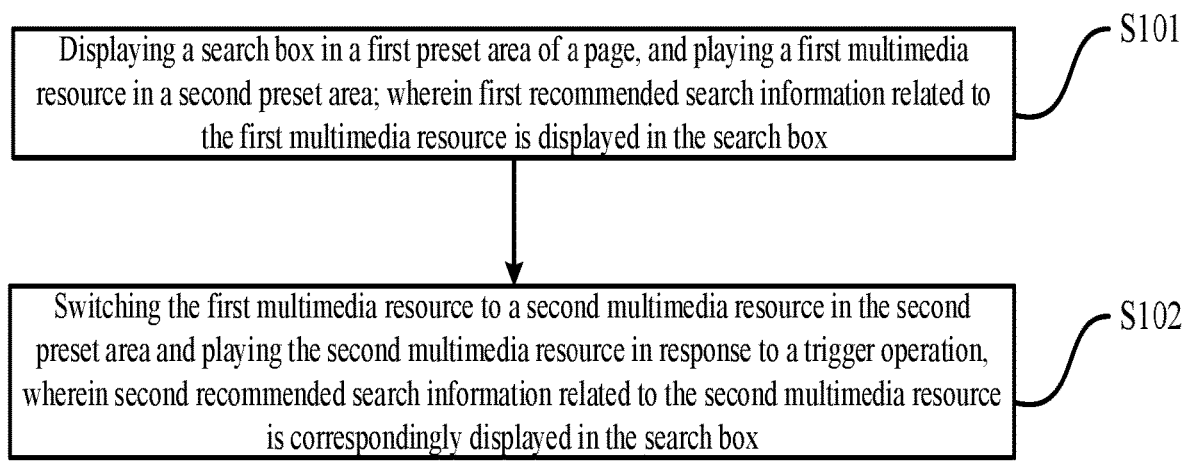
FIG. 1 shows a flowchart of an information display method provided by an embodiment of the present disclosure.

In order to make the purpose, technical solution and advantages of the present disclosure embodiment clearer, the following will be combined with the drawings in the present disclosure embodiment, the technical solution in the present disclosure embodiment is clearly and completely described, obviously, the described embodiment is only a part of the present disclosure embodiment, not all embodiment. Components of the present public embodiments generally described and illustrated herein may be arranged and designed in various configurations. Accordingly, the following detailed description of embodiments of the present disclosure is not intended to limit the scope of the present disclosure for which protection is claimed, but merely indicates selected embodiments of the present disclosure. Based on embodiments of the present disclosure, all other embodiments obtained by those skilled in the art without performing creative labor fall within the scope of the present disclosure.

If a user has a demand for searching people, items, scenes, plots or the like involved in a video when watching the video on a video playing page, the user needs to exit the current video playing page and switch to a browser or an application with a search function to initiate a search. This process is cumbersome, time-consuming and inefficient in information acquisition.

Based on the above research, an embodiment of the present disclosure provides an information display method, an information display device and a computer storage medium which can synchronously display a search box containing recommended search information related to the multimedia resource on a video playing page, and can synchronously switch the recommended search information displayed in the search box when switching the video resource played on the current page, thus improving the efficiency of information search.

The above solution is the results obtained the inventor after practice and careful study. Therefore, the discovery process of the above problems and the solutions proposed by the present disclosure hereinafter to the above problems should be contributions made by the inventor to the present disclosure in the process of the present disclosure.

It should be noted that similar reference numerals and letters indicate similar items in the following figures, so once an item is defined in one drawing, it does not need to be further defined and explained in subsequent figures.

In order to facilitate the understanding of this embodiment, firstly, an information display method disclosed in this embodiment of the present disclosure will be introduced in detail. The execution body of the information display method provided in this embodiment of the present disclosure is generally computer equipment with certain computing power, which includes, for example, a terminal device or other processing devices, and the terminal device may be user equipment (UE), mobile devices, user terminals, terminals, cellular phones, cordless phones, personal digital assistant (PDA), handheld devices, computing devices, vehicle-mounted devices, wearable devices, etc. In some possible embodiments, the information display method can be implemented by a processor invoking computer readable instructions stored in a memory.

It should be noted that the information display method provided by the embodiment of the present disclosure is suitable for various information search scenarios, is mainly applied to the search demands during browsing of a detail page of a related multimedia resource, and is especially suitable for the case that the multimedia resource is a video resource, that is, improvements are made to the interactive display of video playing pages. The information display method provided by the embodiment of the present disclosure will be described below.

The information display method provided by the embodiment of the present disclosure will be described in detail taking the execution body being a terminal device as an example, as follows:

referring to FIG. 1, which is a flowchart of an information display method provided by an embodiment of the present disclosure, the method includes steps S101-S102, wherein:

S101, displaying a search box in a first preset area of a page, and playing a first multimedia resource in a second preset area; wherein first recommended search information related to the first multimedia resource is displayed in the search box.

In the embodiment of the present disclosure, for convenience of description, the following related descriptions will sometimes collectively refer to the first recommended search information and the second recommended search information as recommended search information, and the first multimedia resource and the second multimedia resource as multimedia resources.

Here, the page refers to the page when the multimedia resource is played in full screen, and may specifically include the multimedia recommendation stream page of the target application, the multimedia stream page of the personal homepage, and the multimedia stream page of the related collection/topic.

The genres of the first multimedia resource and the second multimedia resource may include at least one of a video, an audio, a picture, a text and so on; it should be noted that the genres of the first multimedia resource and the second multimedia resource may be the same or different.

The recommended search information may include recommended search sentences, emoticons, keywords and other information used to initiate the search. The recommended search information may be determined based on feature information of a multimedia resource and browsed search data corresponding to the multimedia resource. For example, the first recommended search information may be determined based on the feature information of the first multimedia resource and the browsed search data corresponding to the first multimedia resource, and the second recommended search information may be determined based on the feature information of the second multimedia resource and the browsed search data corresponding to the second multimedia resource.

As mentioned above, the multimedia resource may include at least one of a picture, a text, a video and an audio. Taking the picture as an example, the feature information of the picture may specifically include text description information related to the picture, such as text introduction content corresponding to the picture, the content analysis of the picture, labels or topics set when the picture is uploaded, etc. The browsed search data corresponding to the picture includes the relevant data initiating the search after the picture is browsed, such as the searched media content, input query keywords, etc. Taking the text as an example, the feature information of the text may specifically include the title of the text, the content analysis of the text, labels or topics set when the text is uploaded, and so on. The browsed search data corresponding to the text includes the relevant data initiating the search after the text is browsed, such as the searched media content, input query keywords, etc. Taking the video as an example, the feature information of the video may specifically include text description information related to the video, such as the title of the video, the content analysis of the video, tags or topics set when the video is uploaded, and so on. The browsed search data corresponding to the video includes the relevant data initiating the search after the video is browsed or played, such as the searched media content, input query keywords, etc. Taking the audio as an example, the feature information of the audio may specifically include text description information related to the audio, such as text introduction content corresponding to the audio, the content analysis of the audio, labels or topics set when the audio is uploaded, etc. The browsed search data corresponding to the audio includes the relevant data initiating the search after the audio is played, such as the searched media content, input query keywords, etc. In the embodiment of the present disclosure, detailed introduction will be made by taking the multimedia resource being a video as an example.

When the recommended search information includes a keyword, the keyword can be determined according to the following steps: performing word segmentation on the text description information of a multimedia resource, and selecting candidate words whose correlation with the multimedia resource meets preset conditions from segmented words; and selecting a keyword from the candidate words based on the browsed search data corresponding to the multimedia resource.

Specifically, if the multimedia resource is a video, a server can determine the recommended search information. For example, the above-mentioned text description information of the video can be extracted, and subjected to word segmentation by natural language processing, NLP) technology to obtain multiple segmented words; the segmented words are subjected to duplication eliminating and sensibility eliminating processing to obtain multiple target segmented words; the correlation between each target segmented word and the video is calculated, and target segmented words whose correlation with the video is greater than a preset correlation threshold are selected as candidate words; the matching degree between the determined candidate words and the search words contained in the search data is calculated based on the browsed search data corresponding to the video, and the candidate word with the matching degree greater than a preset matching degree threshold is selected as a keyword contained in the recommended search information.

When the recommended search information includes a recommended search sentence, the recommended search sentence can be determined according to the following methods: carrying out semantic analysis on the text description information of a multimedia resource, splitting the text description information of the multimedia resource into multiple sentences based on the semantic analysis results, and selecting candidate sentences whose correlation with the multimedia resources meets preset conditions from the sentences; and selecting a recommended search sentence from the candidate sentences based on the browsed search data corresponding to the multimedia resource.

Specifically, if the multimedia resource is a video, the server can extract the text description information of the video, and split the text description information of the video into multiple sentences by the NLP technology; calculate the correlation between each sentence and the video, and select sentences whose correlation with the video is greater than a preset correlation threshold as candidate sentences; calculate the matching degree between the determined candidate sentences and the search words contained in the search data based on the browsed search data corresponding to the video, and select a candidate sentence with the matching degree greater than a preset matching degree threshold as a recommended search sentence.

Figure 2A:
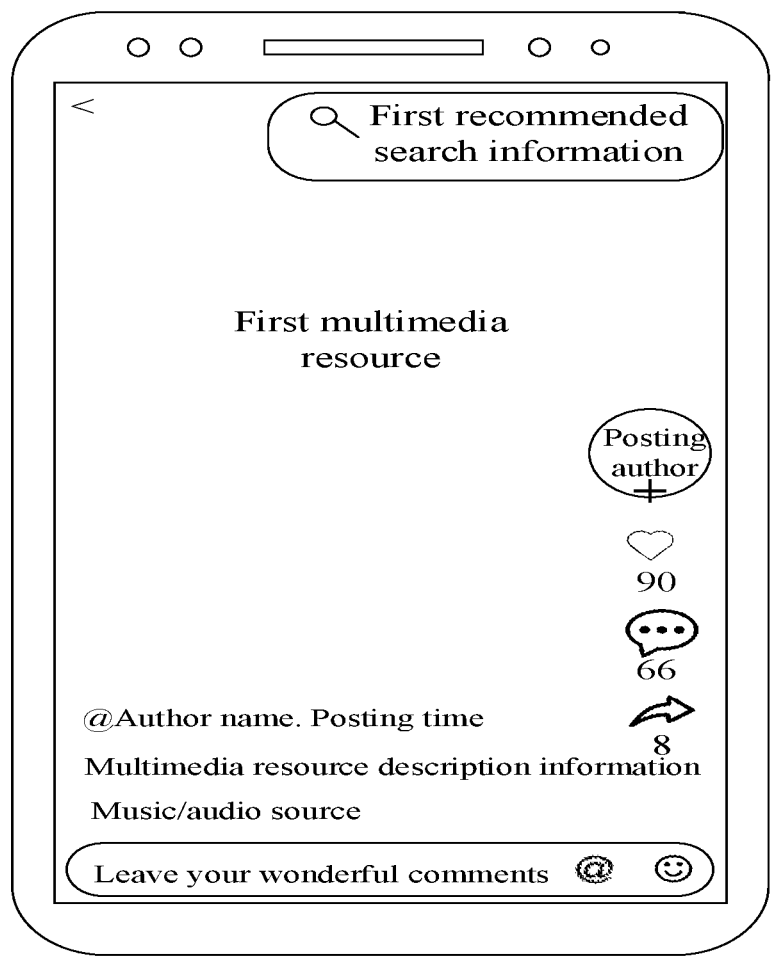
FIG. 2a shows a schematic diagram of a page playing a first multimedia resource in the form of a video recommendation stream in an information display method provided by an embodiment of the present disclosure.

In the embodiment of the present disclosure, when the multimedia resource is a video, the page switches and plays the video in the form of video recommendation stream; a general user can switch videos recommended in the page through preset gestures, here, the preset gestures may be set according to actual needs, such as sliding the screen up and down, sliding the screen left and right, waving the palm up and down in the air, waving the palm left and right in the air, etc. A specific page for switching and playing multimedia resources in the form of video recommendation stream can be shown in FIGS. 2a and 2b. In FIG. 2a, it is indicated that the user can switch the multimedia resource currently displayed in the page by sliding the screen upwards, so as to obtain the page shown in FIG. 2b.

In the embodiment of the present disclosure, the second preset area is set as the whole page area of the page, and the first preset area is set as the area on the floating layer of the page, so that when the multimedia resource played in the second preset area is switched, the search box may not move following the switching of the multimedia resource.

During specific implementation, after a user triggers the identity of a target application and enters the homepage of the target application, the terminal device obtains multiple recommended multimedia resources and recommended search information corresponding to each multimedia resource, plays the first multimedia resource in the whole page area in the form of video recommendation stream, and simultaneously displays a search box containing the first recommended search information in a first preset area on the floating layer of the page while playing the first multimedia resource; the specific display page can be shown in FIG. 2a.

In one possible embodiment, after any multimedia resource identity is triggered on the multimedia resource list page displayed on the personal homepage of an author user (here, the multimedia resource identity may be at least one of the title, introduction, introduction picture and the like corresponding to the multimedia resource), the terminal device obtains the first multimedia resource matched with the multimedia resource identity and recommended search information corresponding to the first multimedia resource, plays the first multimedia resource in the whole page area in the form of video recommendation stream (i.e. displaying of a detail page of the first multimedia resource), and simultaneously displays the search box containing recommended search information in the first preset area on the floating layer of the page while playing the first multimedia resource. The specific display page can be the same as the display page in FIG. 2a.

S102, switching the first multimedia resource to a second multimedia resource in the second preset area and playing the second multimedia resource in response to a trigger operation, wherein second recommended search information related to the second multimedia resource is correspondingly displayed in the search box.

Figure 2B:
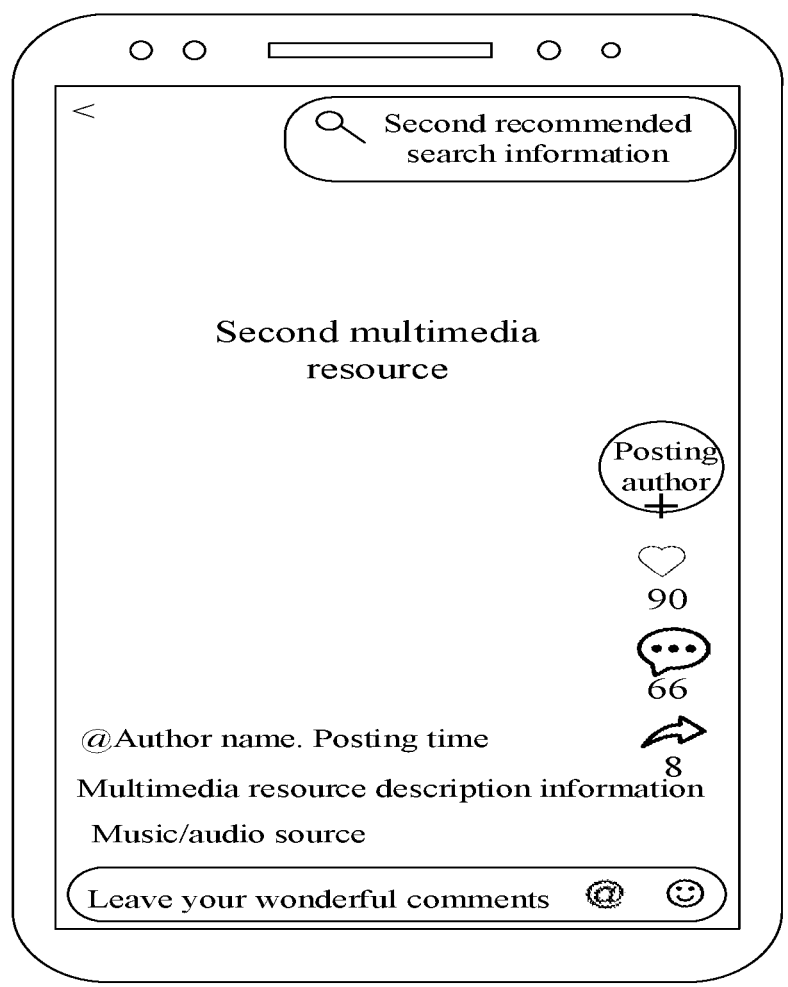
FIG. 2b shows a schematic diagram of a display page switching from a playing page of a first multimedia resource to a playing page of a second multimedia resource in an information display method provided by an embodiment of the present disclosure.

Referring to FIGS. 2a and 2b, during specific implementation, when the detailed content of the multimedia resource is displayed on the playing page of the multimedia resource based on the multimedia resource obtained in S101, the search box containing the recommended search information is synchronously displayed in the playing page of the multimedia resource, the first multimedia resource currently being played in the whole page area can be switched to the second multimedia resource and the second multimedia resource is played (that is, the detailed content of the second multimedia resource is displayed in the whole page area) in response to the multimedia resource switching trigger operation for the playing page of the multimedia resource, and the search box containing the second recommended search information is synchronously displayed in the first preset area on the floating layer of the page while the second multimedia resource is played. The specific display page can be as shown in FIG. 2b. Here, when the page area switches the played multimedia resources, the search box displayed in the first preset area on the floating layer may be static; in addition, the search box can also change with the switching of multimedia resources in the page. For example, the search box may be set in the background area of the played multimedia resources (such as the background of the people in the video) to prevent the search box and the recommended search information in the search box from blocking the foreground content (such as the people in the video) of the played multimedia resources;

for another example, the display size of the search box can be adjusted according to the number of characters corresponding to the switched recommended search information, so that the display size of the search box can adapt to the number of characters of the recommended search information. Specifically, the display size of the search box can be determined according to the number of characters corresponding to the recommended search information; the search box is displayed according to the determined display size, and the recommended search information is displayed in the search box.

Figure 3:
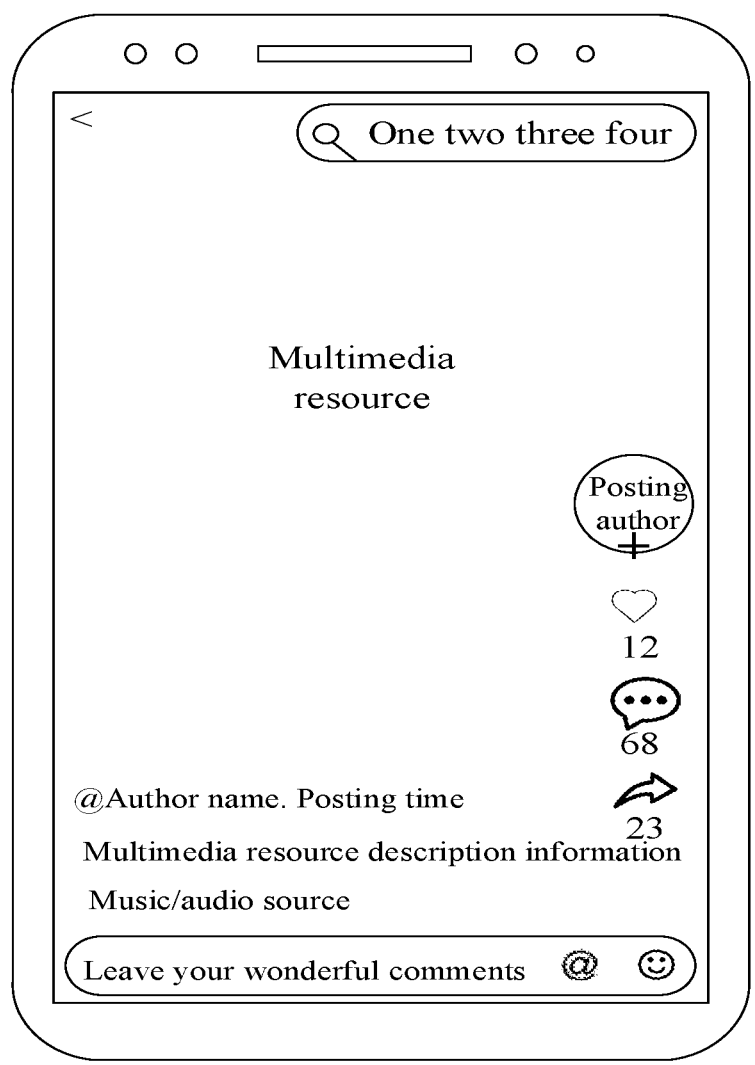
FIG. 3 shows a schematic diagram of a detail page of a multimedia resource displaying recommended search information in a search box in an information display method provided by an embodiment of the present disclosure.

Here, when the number of characters corresponding to the recommended search information is less than the preset number of characters, the display size of the search box can be determined according to the number of characters corresponding to the recommended search information; wherein, the preset number of characters may be a threshold number of characters set according to the needs of display, which is not repeated here. For example, when the preset number of characters is 5, and the number of characters corresponding to the recommended search information is 4, the display size of the search box can be determined according to the number of characters, namely, 4, corresponding to the recommended search information and the preset display size of a single character, and the recommended search information can be displayed in the search box; the specific video playing page is shown in FIG. 3, in which the terminal device being a mobile phone is taken as an example and the recommended search information being "one two three four" is taken as an example.

Here, when the number of characters corresponding to the recommended search information is greater than or equal to the preset number of characters, the display size of the search box can be determined according to the preset number of characters.

Specifically, when the number of characters corresponding to the recommended search information is greater than the preset number of characters, the recommended search information can be limited to be within the preset number of characters, so as to avoid occupying too many screen positions, thereby minimizing the blocking to the played multimedia resource. A target keyword corresponding to the recommended search information is displayed in a search box, wherein the target keyword is determined based on the recommended search information and the preset number of characters; the number of characters of the target keyword is less than or equal to the preset number of characters; the specific method for determining the target keyword corresponding to the recommended search information is as follows: the server can extract key information from the recommended search information based on the NLP technology to obtain the target keyword with the corresponding number of characters less than or equal to the preset number of characters, and feed the target keyword corresponding to the recommended search information back to the terminal device, so that the terminal device can display the target keyword corresponding to the recommended search information in the search box.

Figure 4:
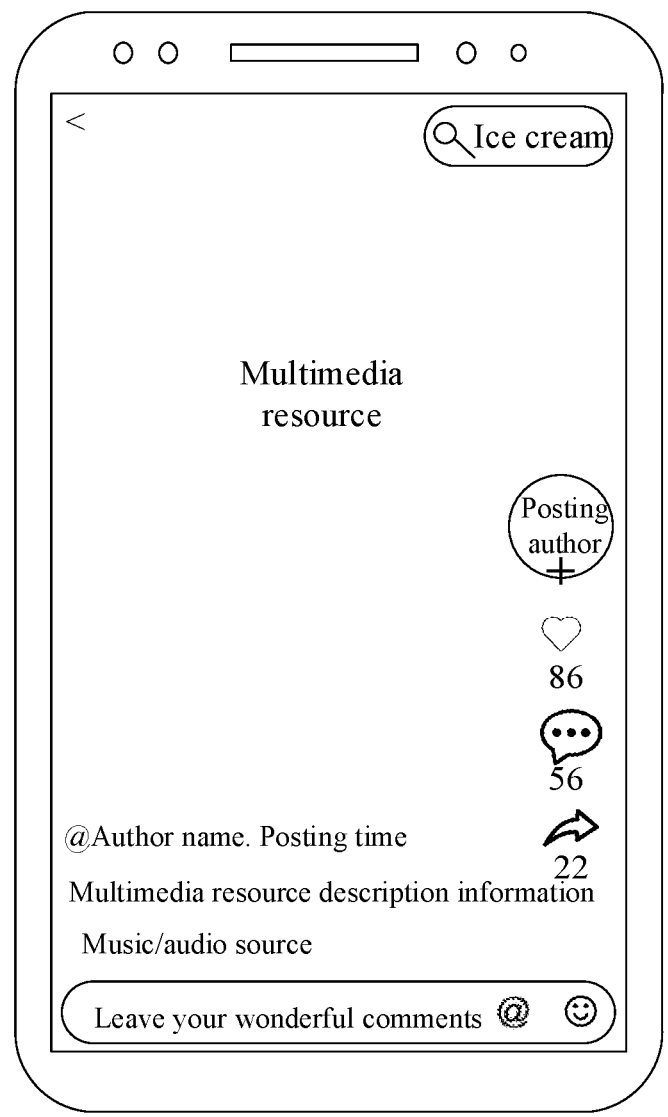
FIG. 4 shows a schematic diagram of a detail page of a multimedia resource displaying a target keyword in a search box in an information display method provided by an embodiment of the present disclosure.

Exemplarily, if the preset number of characters is 3, the determined recommended search information is: "children love eating ice cream"; because the recommended search information contains 6 characters, which is greater than the preset number of characters, the NLP technology is adopted to perform word segmentation on the recommended search information based on the preset number of characters, and three keywords, namely "children", "love eating" and "ice cream", are obtained; it is determined that the correlation between "ice cream" and the multimedia resource is the highest based on the correlation between the keywords and the multimedia resource, and then "ice cream" can be used as the target keyword corresponding to the recommended search information. The specific detail page is shown in FIG. 4.

In another alternative embodiment, when the number of characters corresponding to the recommended search information is greater than the preset number of characters, the characters of the front preset number of characters of the recommended search information can also be displayed in the search box, and the subsequent characters can be omitted, so that when the user triggers the search box, all the characters in the recommended search information can be displayed to the user; for example, if the preset number of characters is 3; the determined recommended search information is "all-match gadget", only "all-match gad" can be displayed in the search box, and when the user triggers the search box, the "all-match gadget" can be displayed to the user.

During specific implementation, the search box is used to obtain the search page associated with the recommended search information displayed in the search box after being triggered. The search page can be displayed in the form of a floating layer in the detail page of the multimedia resource (such as the video playing page), or can skip to the search page associated with the recommended search information from the detail page of the multimedia resource.

During specific implementation, after the user triggers the search box, the terminal device acquires and displays a search intermediate page containing the recommended search information in response to the triggering operation for the search box; by the search intermediate page, extended recommended search information can be provided, and more choices are provided for initiating a further search.

Here, the recommended search information in the search intermediate page is used to display a search result corresponding to target recommended search information after being triggered.

Specifically, the recommended search information is displayed in a search box of the search intermediate page; first extended recommended search information associated with the multimedia resource is displayed in a first area of the search intermediate page; second extended recommended search information determined based on historical browsing data is displayed in a second area of the search intermediate page; and/or multiple recommendation dimensions and third extended recommended search information under each recommendation dimension are displayed in a third area of the search intermediate page.

Wherein the first area of the search intermediate page is used to display the first extended recommended search information associated with the multimedia resource; the second area of the search intermediate page is used to display extended recommended search information associated with the historical browsing data, that is, the second extended recommended search information determined based on the historical browsing data; the third area of the search intermediate page is used to display multiple recommendation dimensions and multiple third extended recommended search information contained under each recommendation dimension.

Here, the first extended recommended search information displayed in the first area of the search intermediate page can be determined based on the feature information of the multimedia resource and the browsed search data corresponding to the multimedia resource; the specific first extended recommended search information may include at least one of the keyword and recommended search sentence determined in S101 above. For the method of determining the first extended recommended search information, please refer to the description of determining the recommended search information in S101 above. The second extended recommended search information may be recommended search information determined based on historical browsing data and associated with user interests.

The recommendation dimension may include timeliness dimension, entity class dimension, geographical location dimension, etc., and multiple third extended recommended search information matched with each recommendation dimension are aggregated under the recommendation dimension; wherein, the timeliness dimension may include, for example, a live streaming dimension and a hot dimension, wherein the third extended recommended search information under the live streaming dimension is associated with the live streaming media content, that is, after searching for the third extended recommended search information under the live streaming dimension, the live streaming media content can be obtained; the third extended recommended search information under the hot dimension is associated with the current hot media content, that is, after searching for the third extended recommended search information under the hot dimension, the hot media content can be obtained; the entity class dimension may include, for example, a celebrity dimension and a high-quality author dimension, wherein the third extended recommended search information under the celebrity dimension is associated with the media content of related celebrities, and the third extended recommended search information under the high-quality author dimension is associated with the media content of related high-quality authors; the geographic location dimension may be determined based on the current location of the terminal. Here, the corresponding timeliness identity is set for the extended recommended search information with high popularity or associated with live streaming; the timeliness identity may include at least one of a picture, a character and a symbol, such as a hot identity with a "flame" symbol, a live streaming identity with a "camera shooting" symbol, and the like.

Figure 5:
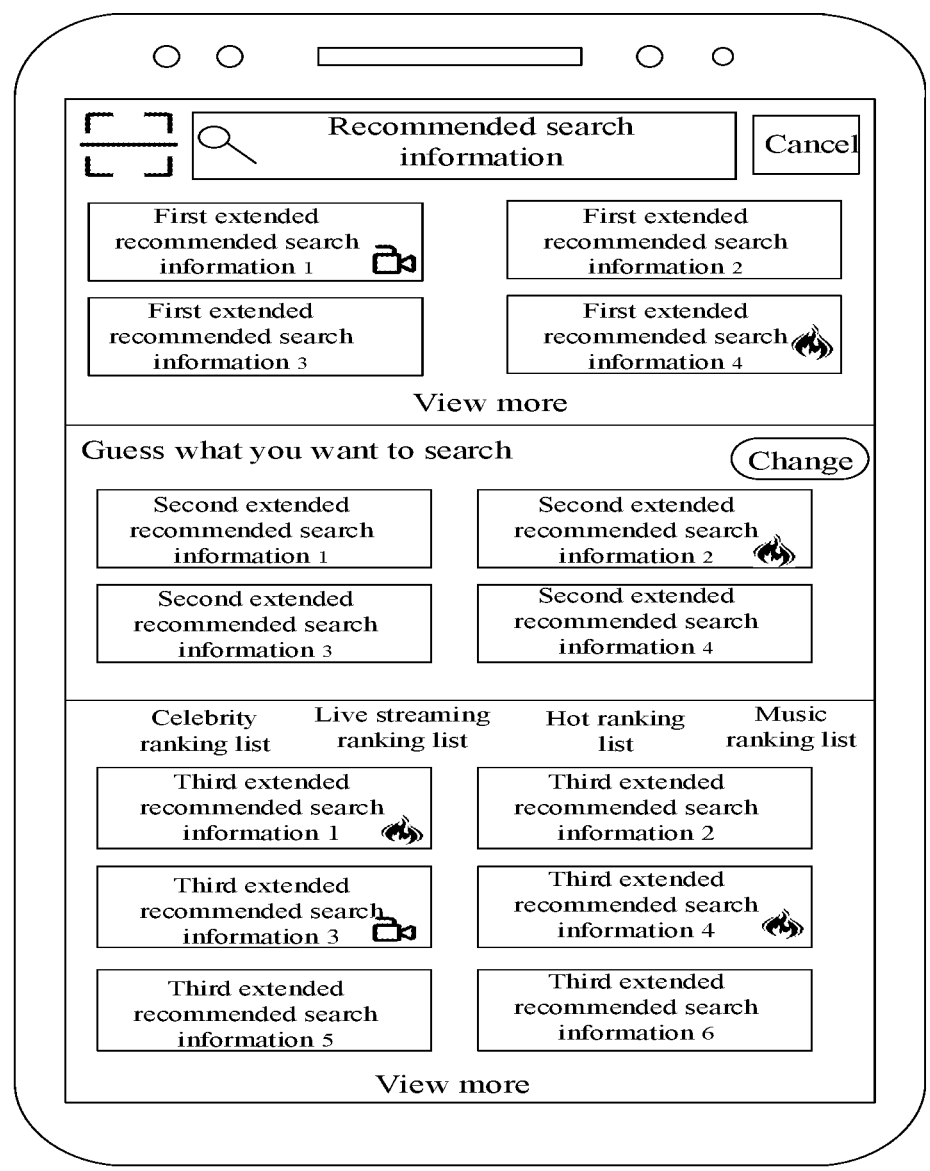
FIG. 5 shows a schematic diagram of a search intermediate page in an information display method provided by an embodiment of the present disclosure.

Exemplarily, a specific search intermediate page can be shown in FIG. 5, and includes a search box containing recommended search information, first extended recommended search information associated with the multimedia resource and displayed in the first area, second extended recommended search information determined based on historical browsing data and displayed in the second area, and multiple recommendation dimensions and third extended recommended search information under each recommendation dimension that are displayed in the third area; here, a hot identity with a "flame" symbol can be added for the extended recommended search information with high popularity, and a live streaming identity with a "camera shooting" symbol can be added for the extended recommended search information associated with live streaming.

Figure 6:
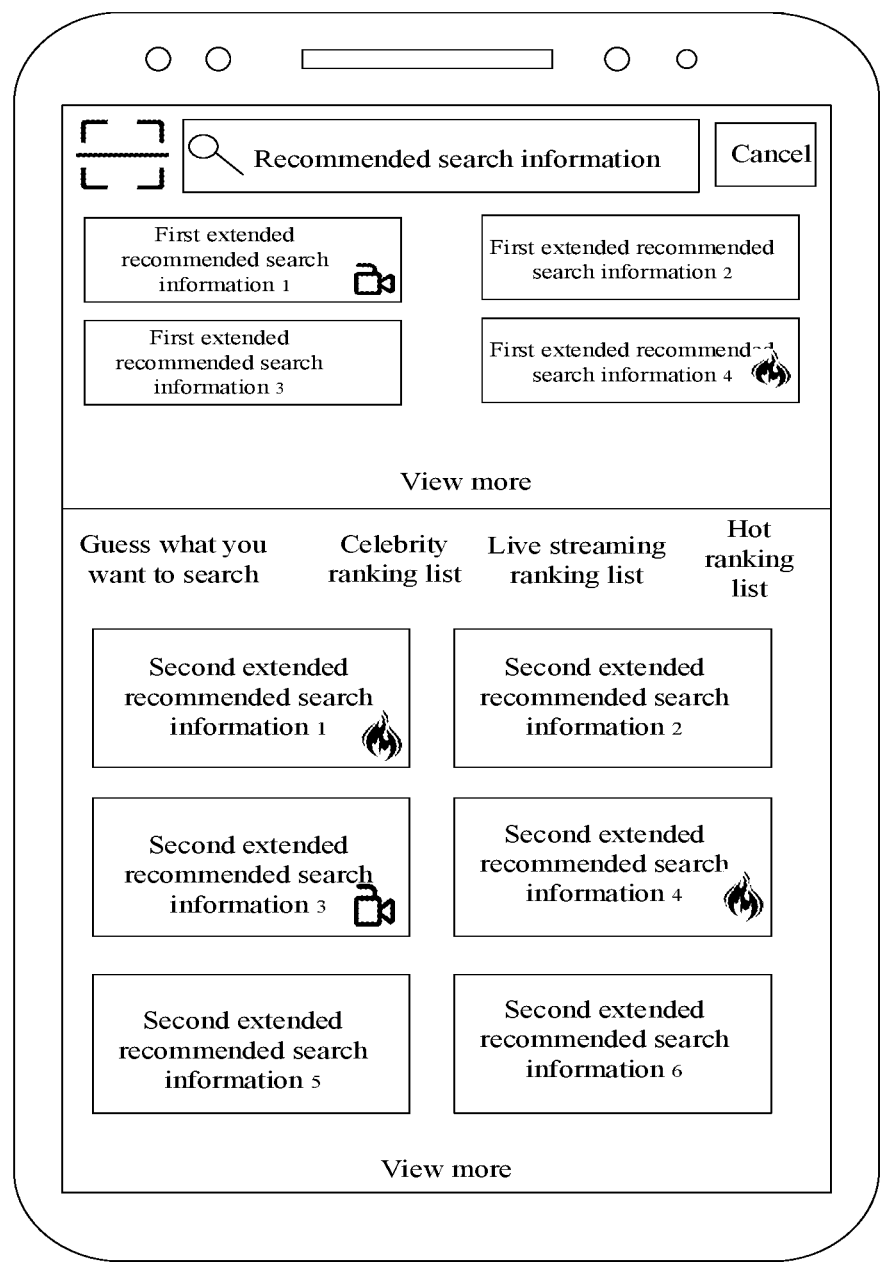
FIG. 6 shows a schematic diagram of another search intermediate page in an information display method provided by an embodiment of the present disclosure.

In one possible embodiment, the search intermediate page may include only the first area and the third area; the first extended recommended search information associated with the multimedia resource can be displayed in the first area of the search intermediate page; the second extended recommended search information determined based on historical browsing data can be regarded as the extended recommended search information under a recommendation dimension (such as "Guess what you want to search") in the third area, that is, multiple recommendation dimensions including the recommendation dimension "Guess what you want to search" and the extended recommended search information under each recommendation dimension are displayed in the third area of the search intermediate page, and the specific search intermediate page can be shown in FIG. 6.

During specific implementation, after the user triggers the recommended search information displayed in the search intermediate page, a search result matched with the recommended search information can be obtained; the search result matched with the recommended search information is displayed in the search intermediate page; or a search result page containing the search result matched with the recommended search information is displayed in the search intermediate page in the form of a floating layer; or the user can skip to a search result page containing the search result matched with the recommended search information from the search intermediate page.

Figure 7:
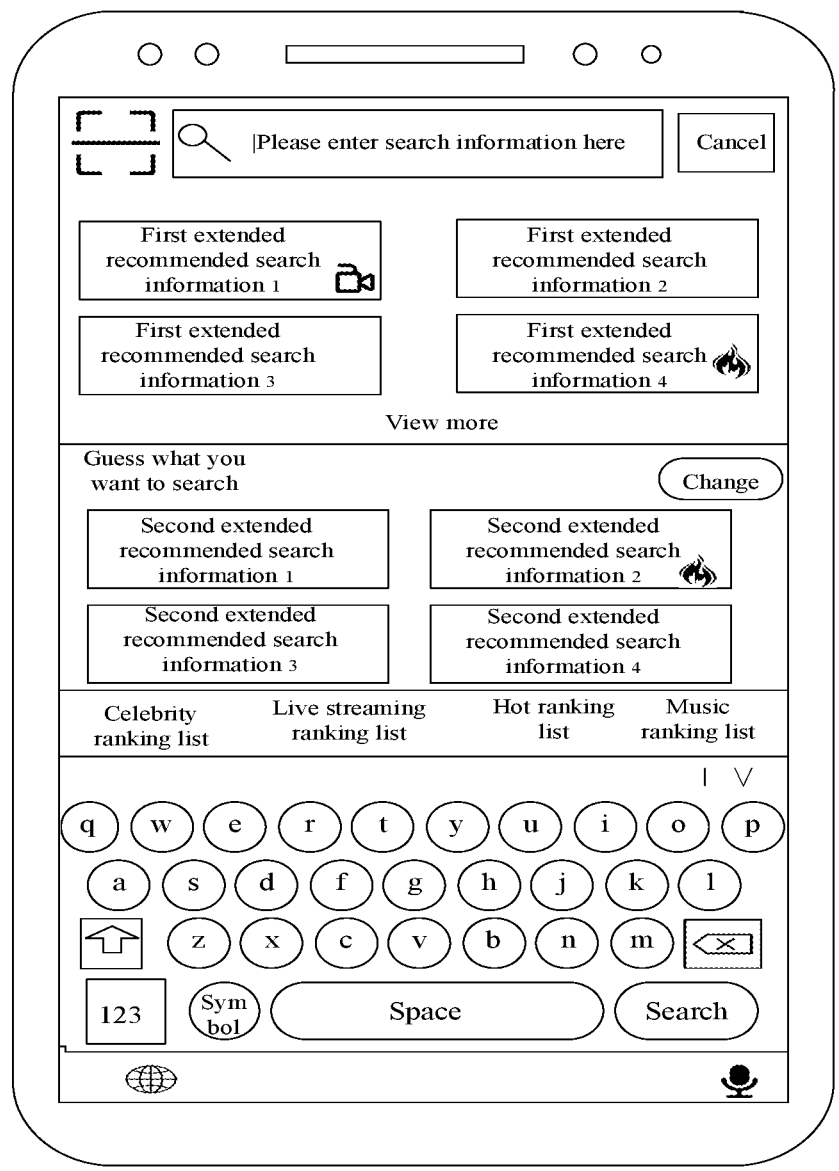
FIG. 7 shows a schematic diagram of a search intermediate page in an editing state in an information display method provided by an embodiment of the present disclosure.

Here, the user can also enter the search word editing state by triggering a search box area in the search intermediate page, input other search words not displayed in the search intermediate page, and search for the other search words; the specific search intermediate page in the editing state can be shown in FIG. 7.

Figure 8:
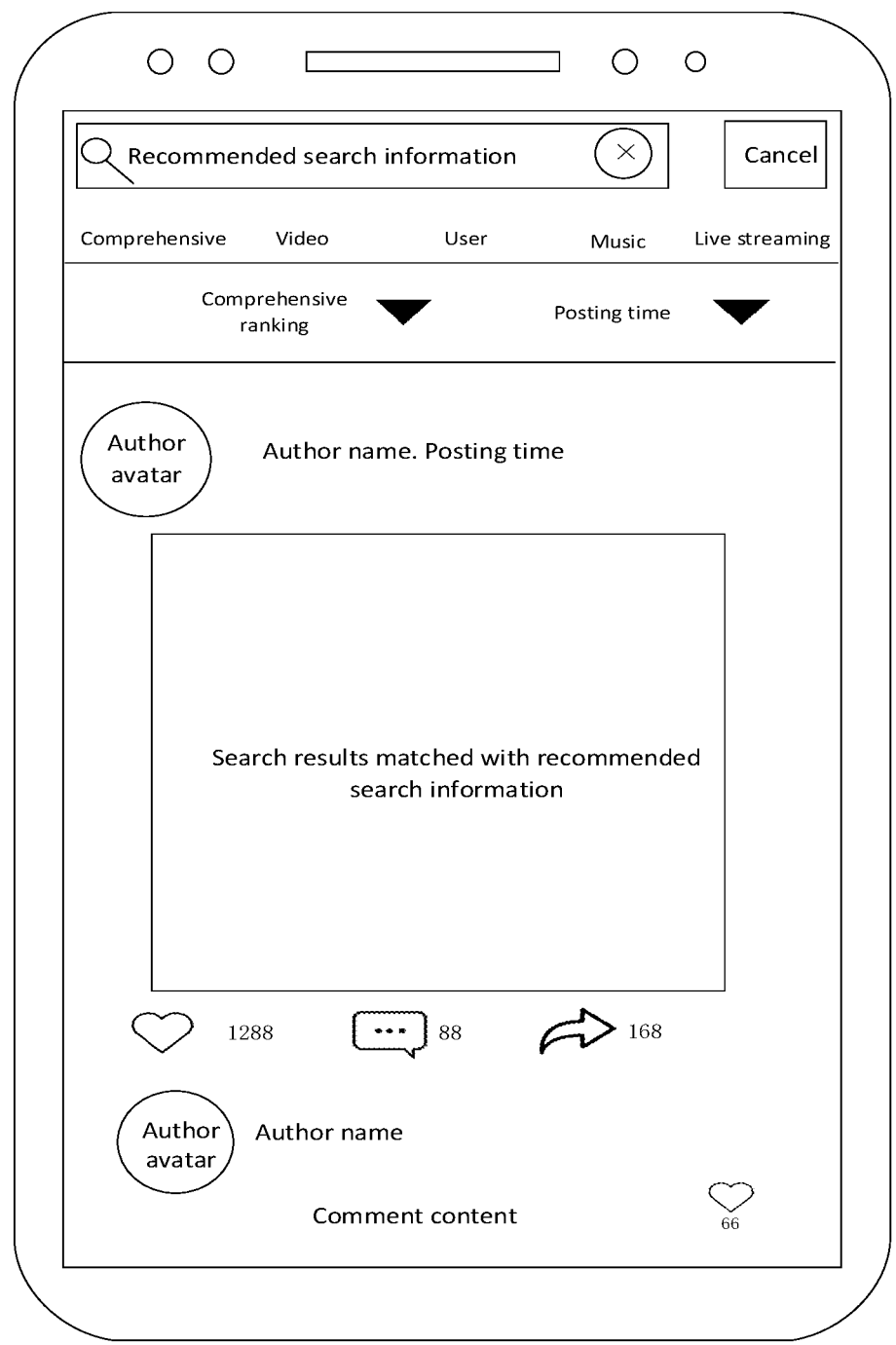
FIG. 8 shows a schematic diagram of a search result page in an information display method provided by an embodiment of the present disclosure.

In an alternative embodiment, after the search box containing recommended search information is displayed on the detail page of the multimedia resource based on S102, the search box is triggered, and the terminal device obtains a search result matched with the recommended search information, and displays a search result page corresponding to the search result in response to the triggering operation for the search box; the specific search result page can be as shown in FIG. 8, and includes the search result matched with the recommended search information.

Figure 9:
FIG. 9 shows a schematic diagram of a detail page of a multimedia resource in an editing state in an information display method provided by an embodiment of the present disclosure.

In another alternative embodiment, after the search box containing recommended search information is displayed on the detail page of the multimedia resource based on S102, the search box is triggered, and then the terminal device enters a search word editing state in response to the triggering operation for the search box. The detail page of the multimedia resource in the editing state can be shown in FIG. 9. After the user inputs the search information, the terminal device obtains search input information input by the user into the search box, initiates a search request with the search input information based on the search input information, obtains a search result matched with the search input information, and displays a search result page corresponding to the search result.

Here, after the search result matched with the search input information is obtained, the search result page corresponding to the search input information can be displayed in the form of a floating layer in the detail page of the multimedia resource; or a user can skip to the search result page corresponding to the search input information from the detail page of the multimedia resource.

In the embodiment of the present disclosure, a search box containing recommended search information related to the multimedia resource can be displayed on the playing page of the multimedia resource, and in addition, when the multimedia resource played in the playing area is switched, the recommended search information in the search box can be changed with the currently played multimedia resource, thus providing a path for initiating a quick search for the currently played multimedia resource, which is simple in operation and improves the efficiency of information search.

It can be understood by those skilled in the art that in the above-mentioned method of specific embodiments, the writing order of the steps does not mean strict execution order and constitutes any limitation on the implementation process, and the specific execution order of each step should be determined according to its function and possible internal logic.

Based on the same inventive concept, the embodiment of the present disclosure also provides an information display device corresponding to the information display method. Since the problem solving principle of the device in the embodiment of the present disclosure is similar to that of the information display method in the embodiment of the present disclosure, the implementation of the device can refer to the implementation of the method, and the repetition will not be repeated here.

Figure 10:
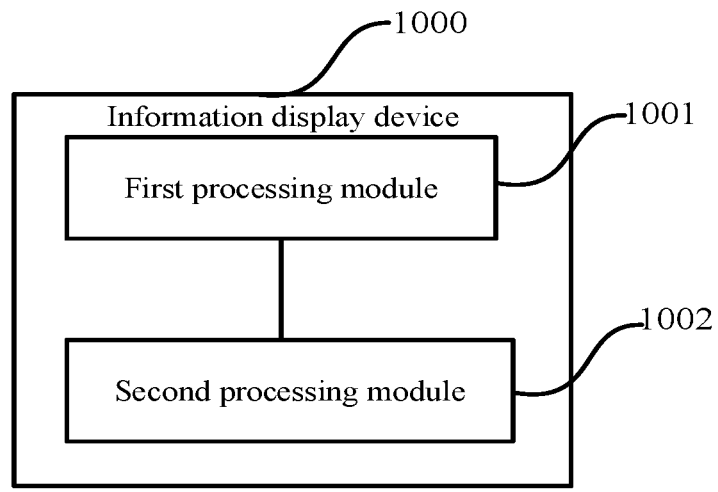
FIG. 10 shows a schematic diagram of an information display device provided by an embodiment of the present disclosure.

Referring to FIG. 10, which is a schematic diagram of an information display device 1000 provided by an embodiment of the present disclosure, the device includes a first processing module 1001 and a second processing module 1002; wherein, the first processing module 1001, configured to display a search box in a first preset area of a page and play a first multimedia resource in a second preset area; wherein first recommended search information related to the first multimedia resource is displayed in the search box; and the second processing module 1002, configured to switch the first multimedia resource to a second multimedia resource in the second preset area and play the second multimedia resource in response to a trigger operation, wherein second recommended search information related to the second multimedia resource is correspondingly displayed in the search box.

in the embodiment of the present disclosure, a search box containing recommended search information related to the multimedia resource can be displayed on the playing page of the multimedia resource, and in addition, when the multimedia resource played in the playing area is switched, the recommended search information in the search box can be changed with the currently played multimedia resource, thereby providing a channel for initiating a quick search for the currently played multimedia resource, which is simple in operation and improves the efficiency of information search.

In another alternative embodiment, the recommended search information is determined based on feature information of a multimedia resource and browsed search data corresponding to the multimedia resource.

In another alternative embodiment, the first processing module 1001, configured to determining a display size of the search box according to a number of characters corresponding to the recommended search information; and displaying the search box according to the determined display size, and displaying the recommended search information in the search box.

In another alternative embodiment, the first processing module 1001, configured to determining the display size of the search box according to the number of characters corresponding to the recommended search information when the number of characters corresponding to the recommended search information is less than a preset number of characters; and determining the display size of the search box according to the preset number of characters when the number of characters corresponding to the recommended search information is greater than or equal to the preset number of characters.

In another alternative embodiment, when the number of characters corresponding to the recommended search information is greater than the preset number of characters, the recommended search information comprises a target keyword; the target keyword is determined based on the recommended search information and the preset number of characters, and the number of characters of the target keyword is less than or equal to the preset number of characters.

In another alternative embodiment, the second processing module 1002, configured to displaying a search intermediate page containing the recommended search information in response to a trigger operation for the search box; wherein the recommended search information in the search intermediate page is configured to display a search result corresponding to the recommended search information after being triggered; or, displaying a search result page associated with the recommended search information; wherein the search result page contains a search result corresponding to the recommended search information.

In another alternative embodiment, the second processing module 1002, configured to displaying the recommended search information in a search box of the search intermediate page;

displaying first extended recommended search information associated with the multimedia resource in a first area of the search intermediate page;

displaying second extended recommended search information determined based on historical browsing data in a second area of the search intermediate page; wherein the second extended recommended search information comprises a timeliness identity; and/or, displaying multiple recommendation dimensions and third extended recommended search information under each recommendation dimension in a third area of the search intermediate page; wherein, the recommendation dimensions at least comprise a timeliness dimension, an entity class dimension and a geographical location dimension.

In another alternative embodiment, the second preset area is the whole page area of the page, and the first preset area is the area on the floating layer of the page.

In another alternative embodiment, the multimedia resource is a video, and the video is switched and played in the page in the form of a video recommendation stream.

In another alternative embodiment, the recommended search information comprises a keyword, and the keyword is determined by the following steps:

performing word segmentation processing on text description information of the multimedia resource, and selecting candidate words whose correlation with the multimedia resource meets preset conditions from the segmented words; and selecting the keyword from the candidate words based on the browsed search data corresponding to the multimedia resource.

For the description of the processing flow of each module in the device and the interaction flow between modules, please refer to the relevant description in the above method embodiment, and will not be described in detail here.

Figure 11:
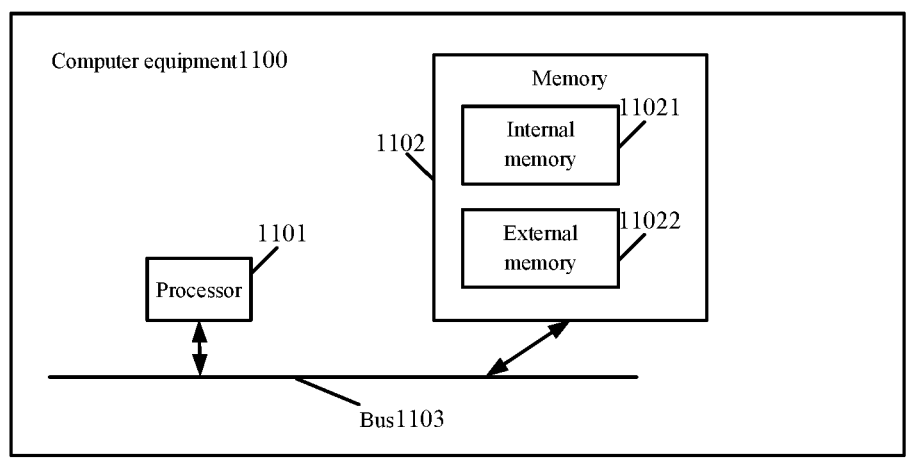
FIG. 11 shows a schematic diagram of computer equipment provided by an embodiment of the present disclosure.

Based on the same technical concept, the embodiment of the present application also provides computer equipment. Referring to FIG. 11, which is a structural schematic diagram of computer equipment 1100 provided by an embodiment of the present application, and the computer equipment includes a processor 1101, a memory 1102, and a bus 1103. The memory 1102 is used to store execution instructions, including an internal memory 11021 and an external memory 11022; here, the internal memory 11021, also called internal storage, is used to temporarily store the operation data in the processor 1101 and data exchanged with the external memory 11022 such as hard disk. The processor 1101 exchanges data with the external memory 11022 through the internal memory 11021. When the computer equipment 1100 runs, the processor 1101 communicates with the memory 1102 through the bus 1103, so that the processor 1101 executes the following instructions:

displaying a search box in a first preset area of a page, and playing a first multimedia resource in a second preset area; wherein first recommended search information related to the first multimedia resource is displayed in the search box; and switching the first multimedia resource to a second multimedia resource in the second preset area and playing the second multimedia resource in response to a trigger operation, wherein second recommended search information related to the second multimedia resource is correspondingly displayed in the search box.

Wherein, the specific processing flow of the processor 1101 may refer to the above method embodiment, which will not be repeated herein.

The present disclosed embodiment also provides a computer-readable storage medium, the computer-readable storage medium stores a computer program, the computer program is run by the processor to perform the steps of the method presented by the information presented in the above method embodiment. wherein the storage medium may be volatile or nonvolatile computer-readable storage media.

The present public embodiment also provides a computer program product, the computer program product carries program code, the program code includes instructions may be used to perform the steps of the method presented by the information presented in the above method embodiment, see the above method embodiment, will not be repeated herein.

Among them, the above computer program products may be specifically realized by hardware, software or a combination thereof. In one optional embodiment, the computer program product is embodied in a computer storage medium, and in another optional embodiment, the computer program product is embodied in a software product, such as a software development kit (Software Development Kit, SDK) and the like.

Those skilled in the art can clearly understand that for the convenience and conciseness of the description, the specific working process of the system and device described above may refer to the corresponding process in the embodiment of the aforementioned method, which will not be repeated herein. In several embodiments provided in the present disclosure, it should be understood that the disclosed system, apparatus and method may be implemented by other means. The embodiments of the device described above are only illustrative, for example, the division of the unit, is only a logical function division, the actual implementation may have another division, and for example, a plurality of units or components may be combined or integrated into another system, or some features may be ignored, or not performed. On another point, the coupling or direct coupling or communication connection between each other shown or discussed may be indirect coupling or communication connection through some communication interface, device or unit, which may be electrical, mechanical or otherwise.

The unit described as a separate component may or may not be physically separated, and the component displayed as a unit may or may not be a physical unit, i.e., may be located in one place, or may also be distributed on a plurality of network units. Some or all of the units may be selected according to actual needs to achieve the purpose of the present embodiment.

Further, each functional unit in each embodiment of the present disclosure may be integrated in a processing unit, or each unit may exist physically alone, or two or more units may be integrated in a unit.

If the function is implemented in the form of a software functional unit and sold or used as a stand-alone product, it may be stored in a nonvolatile computer-readable storage medium executable by a processor. Based on this understanding, the technical solution of the present disclosure essentially or a portion of the prior art contribution or part of the technical solution may be embodied in the form of a software product, the computer software product is stored in a storage medium, including a number of instructions to enable a computer device (may be a personal computer, server, or network device, etc.) to perform all or part of the steps of the method described in each embodiment of the present disclosure. The aforementioned storage media include: U disk, mobile hard disk, Read-Only Memory (ROM), Random Access Memory (RAM), disk or CD and other media that can store program code.

Finally, it should be noted that the above embodiments are only specific embodiments of the present disclosure, to illustrate the technical solution of the present disclosure, not to limit it, the scope of protection of the present disclosure is not limited to this, although the present disclosure is described in detail with reference to the foregoing embodiment, ordinary skill in the art should understand: any person familiar with the art within the scope of the technology disclosed in this disclosure, he can still modify the technical solution described in the foregoing embodiment or can easily think of changes, or equivalently replace some of the technical features; Such modifications, changes or substitutions do not deviate the essence of the corresponding technical solution from the spirit and scope of the technical solution of the present embodiment of the present disclosure, and shall be covered by the scope of protection of the present disclosure. Therefore, the scope of protection of the present disclosure shall be described in accordance with the scope of protection of the claims.

What is claimed is:

1. An information display method, comprising:
    obtaining a recommendation stream comprising a plurality of multimedia resources and recommended search information corresponding to each of the plurality of multimedia resources from a server, wherein the recommended search information corresponding to each of the plurality of multimedia resources is determined based on a correlation with a corresponding multimedia resource and a degree of matching search words in browsed search data associated with the corresponding multimedia resource;
    displaying a search box on a floating layer of a video playing page configured to play videos while playing one of the plurality of multimedia resources in a whole page area of the video playing page, wherein the search box is configured to display recommended search information corresponding to the one of the plurality of multimedia resources which is currently played in the whole page area of the video playing page, and the recommended search information in the search box is synchronously changed as the one of the plurality of multimedia resources played in the whole page area switches to another multimedia resource among the plurality of multimedia resources;
    simultaneously displaying first recommended search information corresponding to a first multimedia resource in the search box on the floating layer of the video playing page while playing the first multimedia resource in the whole page area of the video playing page, wherein the first multimedia resource is among the plurality of multimedia resources;
    switching the first multimedia resource to a second multimedia resource in the whole page area of the video playing page and playing the second multimedia resource in the whole page area of the video playing page, wherein the second multimedia resource is among the plurality of multimedia resources; and
    synchronously switching to display second recommended search information corresponding to the second multimedia resource in the search box on the floating layer of the video playing page while switching to play the second multimedia resource in the whole page area of the video playing page.

2. The method according to claim 1, wherein the recommended search information is determined based on feature information of a multimedia resource and the browsed search data corresponding to the multimedia resource.

3. The method according to claim 2, wherein displaying the search box comprises:
    determining a display size of the search box according to a number of characters corresponding to the recommended search information; and
    displaying the search box according to the determined display size, and displaying the recommended search information in the search box.

4. The method according to claim 3, wherein determining the display size of the search box according to the number of characters corresponding to the recommended search information comprises:
    determining the display size of the search box according to the number of characters corresponding to the recommended search information when the number of characters corresponding to the recommended search information is less than a preset number of characters; and
    determining the display size of the search box according to the preset number of characters when the number of characters corresponding to the recommended search information is greater than or equal to the preset number of characters.

5. The method according to claim 4, wherein when the number of characters corresponding to the recommended search information is greater than the preset number of characters, the recommended search information comprises a target keyword; the target keyword is determined based on the recommended search information and the preset number of characters, and the number of characters of the target keyword is less than or equal to the preset number of characters.

6. The method according to claim 2, wherein the method further comprises:
    displaying a search intermediate page containing the recommended search information in response to a trigger operation for the search box; wherein the recommended search information in the search intermediate page is configured to display a search result corresponding to the recommended search information after being triggered; or, displaying a search result page associated with the recommended search information; wherein the search result page contains a search result corresponding to the recommended search information.

7. The method according to claim 6, wherein displaying the search intermediate page containing the recommended search information comprises:

displaying the recommended search information in a search box of the search intermediate page;

displaying first extended recommended search information associated with the multimedia resource in a first area of the search intermediate page;

displaying second extended recommended search information determined based on historical browsing data in a second area of the search intermediate page; wherein the second extended recommended search information comprises a timeliness identity; and/or, displaying multiple recommendation dimensions and third extended recommended search information under each recommendation dimension in a third area of the search intermediate page; wherein, the recommendation dimensions at least comprise a timeliness dimension, an entity class dimension and a geographical location dimension.

8. The method according to claim 2, wherein the multimedia resource is a video, and the video is switched and played in the page in the form of a video recommendation stream.

9. The method according to claim 2, wherein the recommended search information comprises a keyword, and the keyword is determined by:

performing word segmentation processing on text description information of the corresponding multimedia resource, and selecting candidate words whose correlation with the corresponding multimedia resource meets preset conditions from the segmented words; and selecting the keyword from the candidate words based on the browsed search data corresponding to the multimedia resource.

10. An information display device, comprising:

at least one processor; and at least one memory communicatively coupled to the at least one processor and storing instructions that upon execution by the at least one processor cause the at least one processor to:

obtain a recommendation stream comprising a plurality of multimedia resources and recommended search information corresponding to each of the plurality of multimedia resources from a server, wherein the recommended search information corresponding to each of the plurality of multimedia resources is determined based on a correlation with a corresponding multimedia resource and a degree of matching search words in browsed search data associated with the corresponding multimedia resource;

display a search box on a floating layer of a video playing page configured to play videos and play one of the plurality of multimedia resources in a whole page area of the video playing page, wherein the search box is configured to display recommended search information corresponding to the one of the plurality of multimedia resources which is currently played in the whole page area of the video playing page, and the recommended search information in the search box is synchronously changed as the one of the plurality of multimedia resources played in the whole page area switches to another multimedia resource among the plurality of multimedia resources;

simultaneously display first recommended search information corresponding to a first multimedia resource in the search box on the floating layer of the video playing page while playing the first multimedia resource in the whole page area of the video playing page, wherein the first multimedia resource is among the plurality of multimedia resources;

switch the first multimedia resource to a second multimedia resource in the whole page area of the video playing page and play the second multimedia resource in the whole page area of the video playing page, wherein the second multimedia resource is among the plurality of multimedia resources; and synchronously switch to display second recommended search information corresponding to the second multimedia resource in the search box on the floating layer of the video playing page while switching to play the second multimedia resource in the whole page area of the video playing page.

11. A computer equipment, comprising a processor and a memory, wherein the memory stores machine readable instructions executable by the processor, and the processor is configured to execute the machine readable instructions stored in the memory, and when the machine readable instructions are executed by the processor, the processor executes operations comprising:

obtaining a recommendation stream comprising a plurality of multimedia resources and recommended search information corresponding to each of the plurality of multimedia resources from a server, wherein the recommended search information corresponding to each of the plurality of multimedia resources is determined based on a correlation with a corresponding multimedia resource and a degree of matching search words in browsed search data associated with the corresponding multimedia resource;

displaying a search box on a floating layer of a video playing page configured to play videos while playing one of the plurality of multimedia resources in a whole page area of the video playing page, wherein the search box is configured to display recommended search information corresponding to the one of the plurality of multimedia resources which is currently played in the whole page area of the video playing page, and the recommended search information in the search box is synchronously changed as a multimedia resource played in the whole page area switches to another multimedia resource among the plurality of multimedia resources;

simultaneously displaying first recommended search information corresponding to a first multimedia resource in the search box on the floating layer of the video playing page while playing the first multimedia resource in the whole page area of the video playing page, wherein the first multimedia resource is among the plurality of multimedia resources;

switching the first multimedia resource to a second multimedia resource in the whole page area of the video playing page and playing the second multimedia resource in the whole page area of the video playing page, wherein the second multimedia resource is among the plurality of multimedia resources; and synchronously switching to display second recommended search information corresponding to the second multimedia resource in the search box on the floating layer of the video playing page while switching to play the second multimedia resource in the whole page area of the video playing page.

12. A non-transitory computer-readable storage medium, storing a computer program, wherein when the computer program is executed by a computer equipment, the computer program causes the computer equipment to perform operations comprising:

obtaining a recommendation stream comprising a plurality of multimedia resources and recommended search information corresponding to each of the plurality of multimedia resources from a server, wherein the recommended search information corresponding to each of the plurality of multimedia resources is determined based on a correlation with a corresponding multimedia resource and a degree of matching search words in browsed search data associated with the corresponding multimedia resource;

displaying a search box on a floating layer of a video playing page configured to play videos while playing one of the plurality of multimedia resources in a whole page area of the video playing page, wherein the search box is configured to display recommended search information corresponding to the one of the plurality of multimedia resources which is currently played in the whole page area of the video playing page, and the recommended search information in the search box is synchronously changed as the one of the plurality of multimedia resources played in the whole page area switches to another multimedia resource among the plurality of multimedia resources;

simultaneously displaying first recommended search information corresponding to a first multimedia resource in the search box on the floating layer of the video playing page while playing the first multimedia resource in the whole page area of the video playing page, wherein the first multimedia resource is among the plurality of multimedia resources;

switching the first multimedia resource to a second multimedia resource in the whole page area of the video playing page and playing the second multimedia resource in the whole page area of the video playing page, wherein the second multimedia resource is among the plurality of multimedia resources; and synchronously switching to display second recommended search information corresponding to the second multimedia resource in the search box on the floating layer of the video playing page while switching to play the second multimedia resource in the whole page area of the video playing page.

\* \* \* \* \*